(12) United States Patent  
Lien et al.

(10) Patent No.: US 9,035,916 B2  
(45) Date of Patent: May 19, 2015

(54) OPTICAL TOUCH DISPLAY PANEL

(71) Applicant: AU OPTRONICS CORP., Hsinchu (TW)

(72) Inventors: Chung-Min Lien, Taipei (TW); Hsin-Yu Pan, Hsichu (TW); Yueh-Hung Chung, Taipei (TW); Ya-Ling Hsu, New Taipei (TW)

(73) Assignee: AU OPTRONICS CORP., Hsinchu (TW)

( * ) Notice: Subject to any disclaimer, the term of this patent is extended or adjusted under 35 U.S.C. 154(b) by 117 days.

(21) Appl. No.: 13/776,830

(22) Filed: Feb. 26, 2013

(65) Prior Publication Data

US 2014/0098064 A1  Apr. 10, 2014

(30) Foreign Application Priority Data

Oct. 9, 2012  (TW) .............................. 101137308 A

(51) Int. Cl.  
*G06F 3/042* (2006.01)  
*G06F 3/041* (2006.01)

(52) U.S. Cl.  
CPC ............ *G06F 3/0416* (2013.01); *G06F 3/0418* (2013.01); *G06F 3/0421* (2013.01)

(58) Field of Classification Search  
CPC ...................................................... G06F 3/042  
USPC ................................................ 345/173–175  
See application file for complete search history.

(56) References Cited

U.S. PATENT DOCUMENTS

| 8,400,413 | B2* | 3/2013 | Otani et al. .................... 345/173 |
| 8,436,835 | B2* | 5/2013 | Liu et al. ........................ 345/175 |
| 8,665,243 | B2* | 3/2014 | Senda et al. .................. 345/175 |
| 2005/0231656 | A1* | 10/2005 | den Boer et al. ............... 349/42 |
| 2006/0214892 | A1* | 9/2006 | Harada et al. ................... 345/81 |
| 2007/0229452 | A1* | 10/2007 | Sano et al. .................... 345/102 |
| 2012/0293460 | A1* | 11/2012 | Liu ............................... 345/175 |

FOREIGN PATENT DOCUMENTS

CN  102270070  12/2011

* cited by examiner

*Primary Examiner* — Pegeman Karimi  
(74) *Attorney, Agent, or Firm* — WPAT, PC; Justin King

(57) ABSTRACT

An optical touch display panel includes a plurality of light-sensing touch units and a position detecting circuit. Each light-sensing touch unit includes a light-sensing component, a storage capacitor, a signal reading component, and a charging component. The light-sensing component senses a light source to generate a sensing signal. The storage capacitor is connected electrically to the light-sensing component for storing the sensing signal. The signal reading component is connected electrically to the storage capacitor for reading a voltage of the storage capacitor to generate a reading signal. The charging signal is connected electrically to the storage capacitor for charging the storage capacitor to reset an electric charge record of the storage capacitor. The position detecting circuit is connected electrically to the light-sensing touch units for detecting a touch point on the optical touch display panel according to a reading signal output by each of the light-sensing touch units.

14 Claims, 18 Drawing Sheets

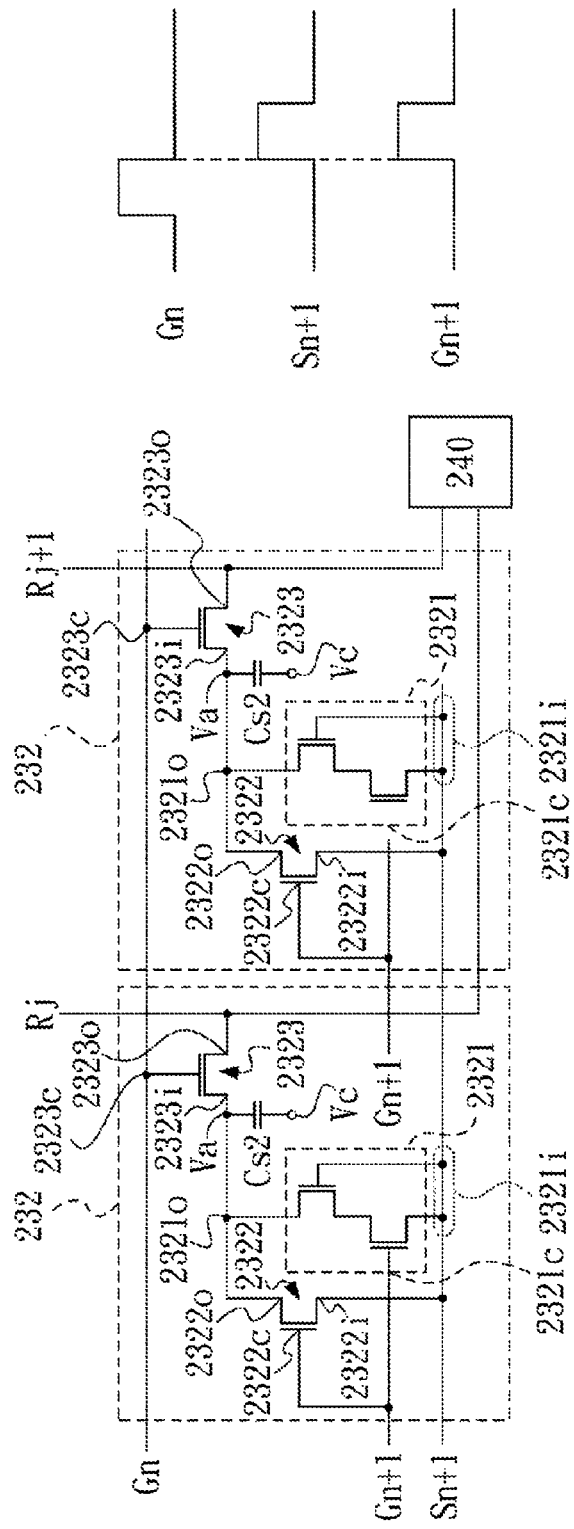

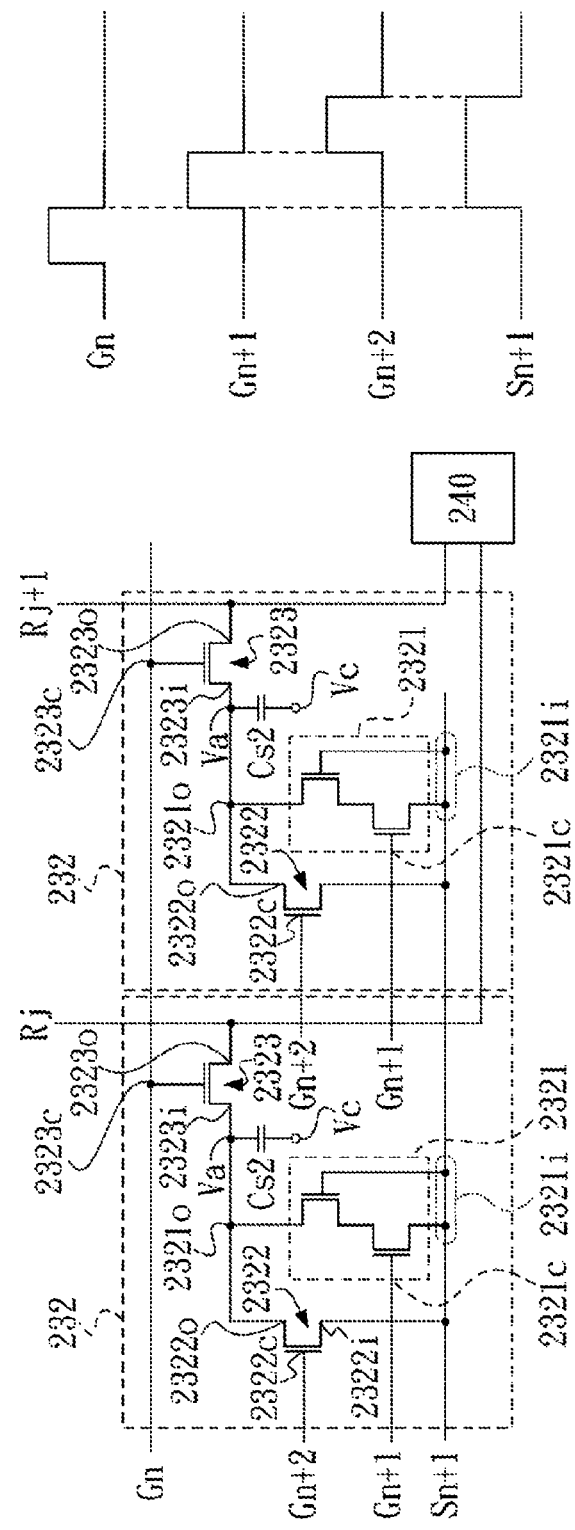

OPTICAL TOUCH DISPLAY PANEL

CROSS-REFERENCES TO RELATED APPLICATIONS

This non-provisional application claims priority under 35 U.S.C. §119(a) on Patent Application No. 101137308 filed in Taiwan, R.O.C. on 2012 Oct. 9, the entire contents of which are hereby incorporated by reference.

BACKGROUND OF THE INVENTION

1. Technical Field

The present invention relates to a touch display panel, and in particular, to an optical touch display panel.

2. Related Art

With the development of science and technologies, currently, a touch display panel is widely used as a man-machine data communication interface in many consumption electronic products (such as, personal digital assistants (PDAs), mobile phones, and tablet computers). The touch display panel may use different sensing technologies, such as resistive, capacitive, and optical sensing technologies, to detect the position where a user touches on the touch display panel.

FIG. 1 is a first schematic view of detection by a light-sensing touch display panel 100 according to the prior art. FIG. 2 is a second schematic view of detection by a light-sensing touch display panel 100 according to the prior art. FIG. 3 is a schematic view of light-sensing signals generated by a light-sensing component 110 when receiving light of different intensities according to the prior art.

As shown in FIG. 1, the light-sensing touch display panel 100 includes the light-sensing component 110, which is used for detecting change of an external light source. In a normal situation, the light-sensing component 110 detects an environment light L and generates a light-sensing signal S1 (see FIG. 3).

Please refer to FIG. 1, in which when a finger 120 contacts or gets close to the light-sensing touch display panel 100 and blocks the environment light L being received by the light-sensing component 110, the light-sensing component 110 correspondingly generates a light-sensing signal S2 (see FIG. 3).

Please refer to FIG. 2, in which when a light pen 130 gets close to or contacts the light-sensing touch display panel 100, the light-sensing component 110, in addition to receiving the environment light L, also receives light emitted by the light pen 130, and the light-sensing component 110 correspondingly generates a light-sensing signal S3 (see FIG. 3).

As shown in FIG. 3 for example, the light-sensing component 110 is a thin-film transistor (TFT). When a gate (G)-source (S) voltage (that is, Vgs) of the light-sensing component 110 is less than zero volt, the greater intensity of the light received by the light-sensing component 110 results in a greater drain-source current Ids.

FIG. 4 is a detection circuit diagram of the light-sensing component 110 according to the prior art. FIG. 5 is a schematic view of correspondence between a voltage level of a first end Va of a capacitor irradiated by different light sources and the gate-source voltage Vgs according to the prior art.

As shown in FIG. 4, the light-sensing component 110 is connected electrically to a storage capacitor Cs1. When the light-sensing component 110 generates different light-sensing signals (that is, drain-source currents Ids), as a result of detecting different light sources, the voltage level of the first end Va of the storage capacitor Cs1 decreases accordingly. The voltage level of the first end Va of the storage capacitor Cs1 can be used to determine whether a touch input is made.

It is taken as example that the light pen 130 shown in FIG. 2 is used for making a touch input. Before a touch input is made, the light-sensing component 110 is only irradiated by the environment light L, so that a reading signal Ro generated by the voltage level of the first end Va of the storage capacitor Cs1 is a dark state voltage V1 (see FIG. 5). When a touch input is made, the light-sensing component 110, in addition to receiving the environment light L, also receives the light emitted by the light pen, so that the reading signal Ro is a bright state voltage V2 (see FIG. 5). Whether a touch input is made can be determined by determining whether a voltage difference ΔV between the bright state voltage V2 and the dark state voltage V1 exceeds a predetermined threshold value.

After the voltage of the first end Va of the storage capacitor Cs1 reaches a level, in order to detect a touch input once again, the voltage of the storage capacitor Cs1 must be reset, that is, the storage capacitor Cs1 must be charged so that the voltage thereof reaches a reset voltage. However, to synchronize a touch interface with a display image, a touch detection frequency is generally the same as a screen update frequency (that is, a frame rate). Being restricted by the frame rate, the time for charging the storage capacitor Cs1 (referred to as a "reset time" for short below), is limited, so that a reset voltage level of the storage capacitor Cs1 is not high enough, which results in a low dark state voltage level. When the bright state voltage level is fixed, the voltage difference ΔV is small, which causes a low signal-to-noise ratio, thereby easily resulting in false determination in the detection of a touch event.

SUMMARY

In view of the above problem, the present invention provides an optical touch display panel, so as to solve the problem of false determination caused by a low reset voltage level in the prior art.

An embodiment provides an optical touch display panel, which includes a plurality of light-sensing touch units and a position detecting circuit.

Each light-sensing touch unit includes a light-sensing component, a storage capacitor, a signal reading component, and a charging component. The light-sensing component senses a light source and generates a sensing signal. The storage capacitor is connected electrically to the light-sensing component and is used for storing the sensing signal. The signal reading component is connected electrically to the storage capacitor and is used for reading a voltage of the storage capacitor to generate a reading signal. The charging component is connected electrically to the storage capacitor and is used for charging the storage capacitor to reset an electric charge record of the storage capacitor.

The position detecting circuit is connected electrically to the light-sensing touch units, and is used for detecting a touch point on the optical touch display panel according to a reading signal output by each of the light-sensing touch units.

The optical touch display panel according to the present invention may elevate a reset voltage level of the storage capacitor, and therefore, increase a voltage difference between a dark state voltage and a bright state voltage, thereby effectively reducing the probability of false determination in the detection of a touch event.

BRIEF DESCRIPTION OF THE DRAWINGS

The present invention will become more fully understood from the detailed description given herein below for illustration only, and thus not limitative of the present invention, wherein:

FIG. 10A shows a first embodiment of light-sensing touch units according to an embodiment;

FIG. 10B is a timing diagram of scan signal lines and a reset signal line shown in FIG. 10A;

FIG. 12A shows a third embodiment of light-sensing touch units according to an embodiment;

FIG. 12B is a timing diagram of scan signal lines and a reset signal line shown in FIG. 12A;

DETAILED DESCRIPTION

Figure 1:
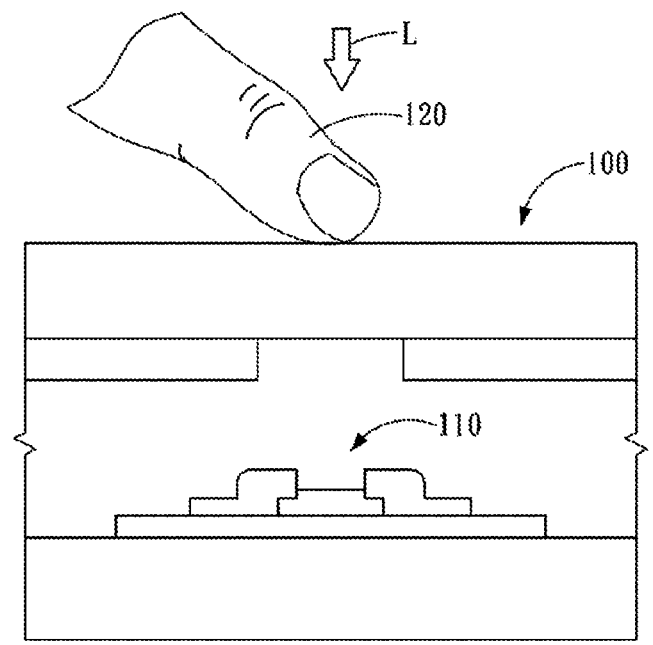
FIG. 1 is a first schematic view of detection by a light-sensing touch display panel according to the prior art.
Figure 2:
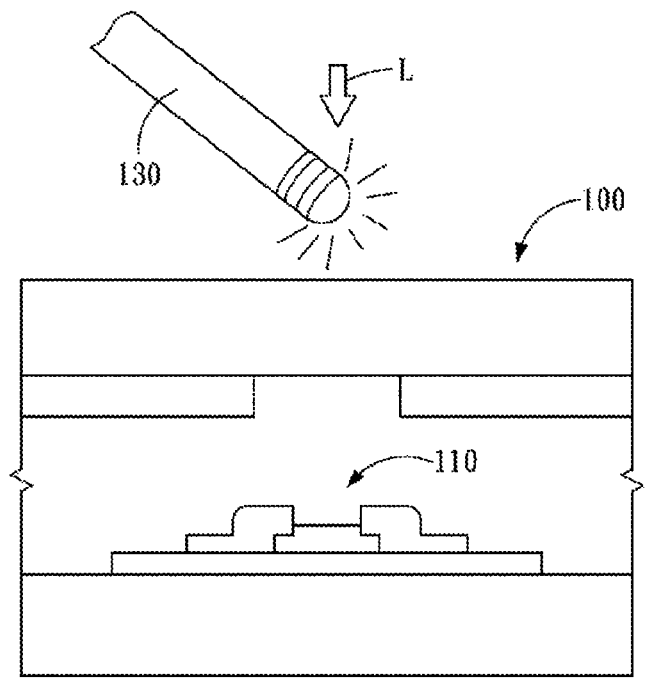
FIG. 2 is a second schematic view of detection by a light-sensing touch display panel according to the prior art.
Figure 3:
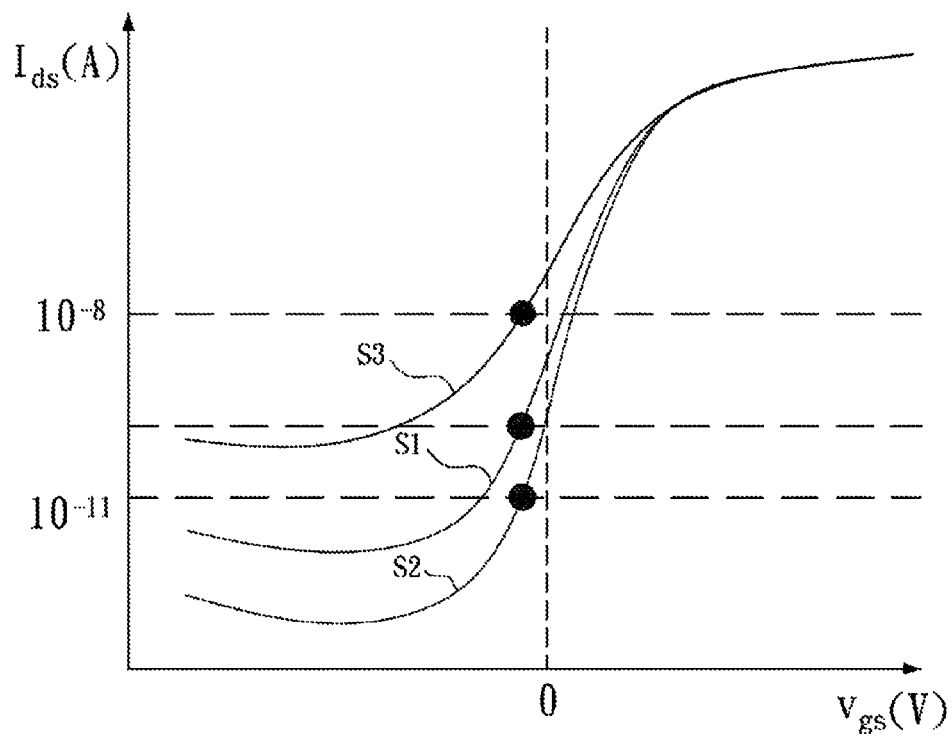
FIG. 3 is a schematic view of light-sensing signals generated by a light-sensing component when receiving lights of different intensities according to the prior art.
Figure 4:
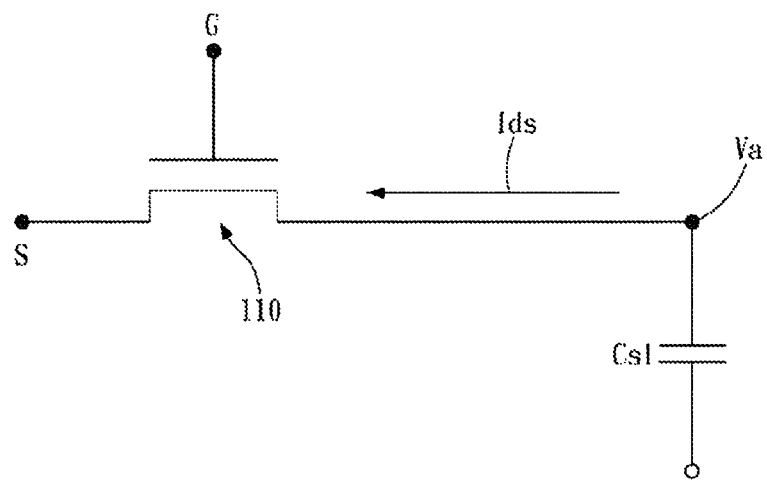
FIG. 4 is a detection circuit diagram of a light-sensing component according to the prior art.
Figure 5:
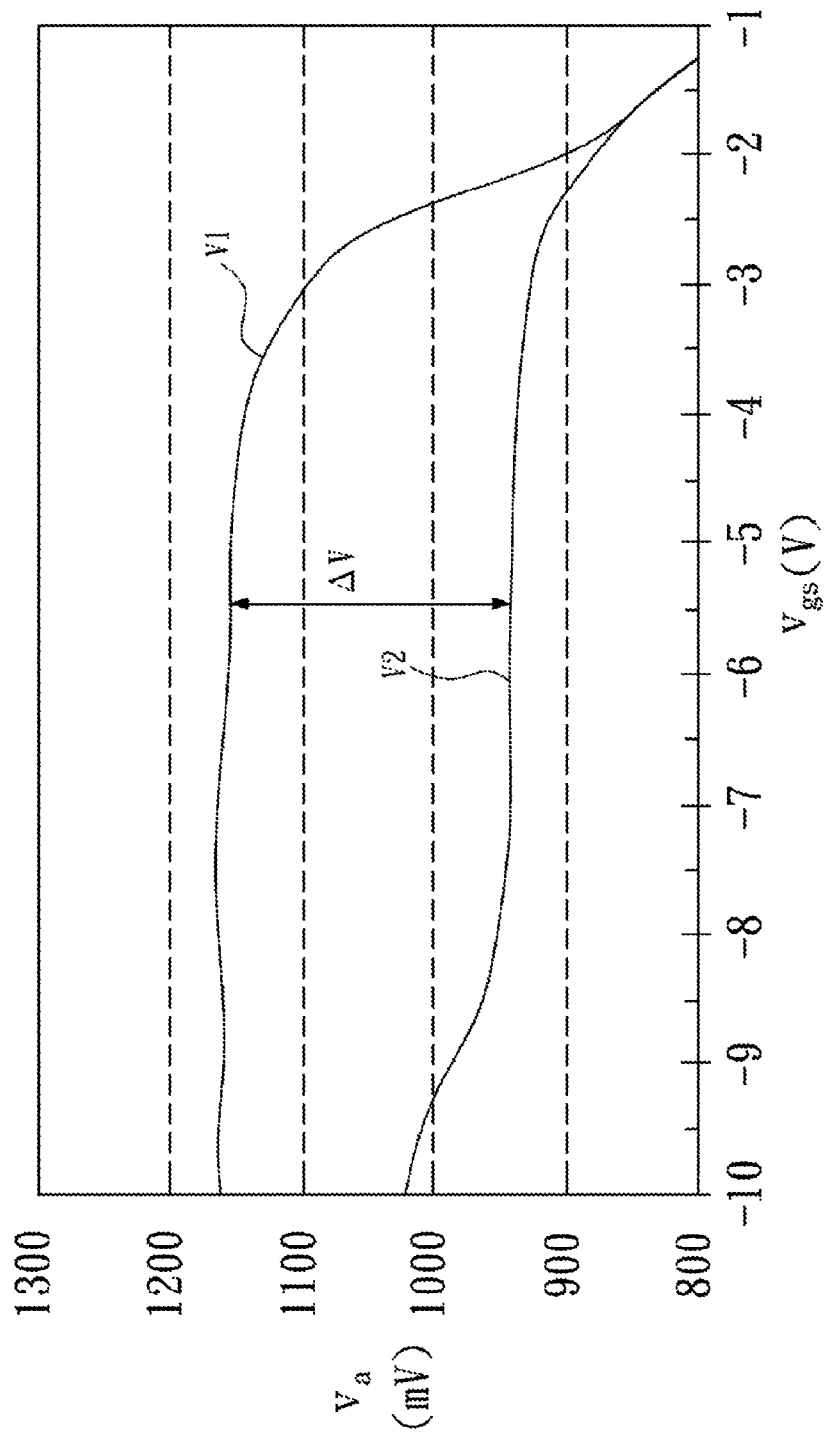
FIG. 5 is a schematic view of correspondence between a voltage level of a first end of a storage capacitor irradiated by different light sources and a gate-source voltage according to the prior art.
Figure 6:
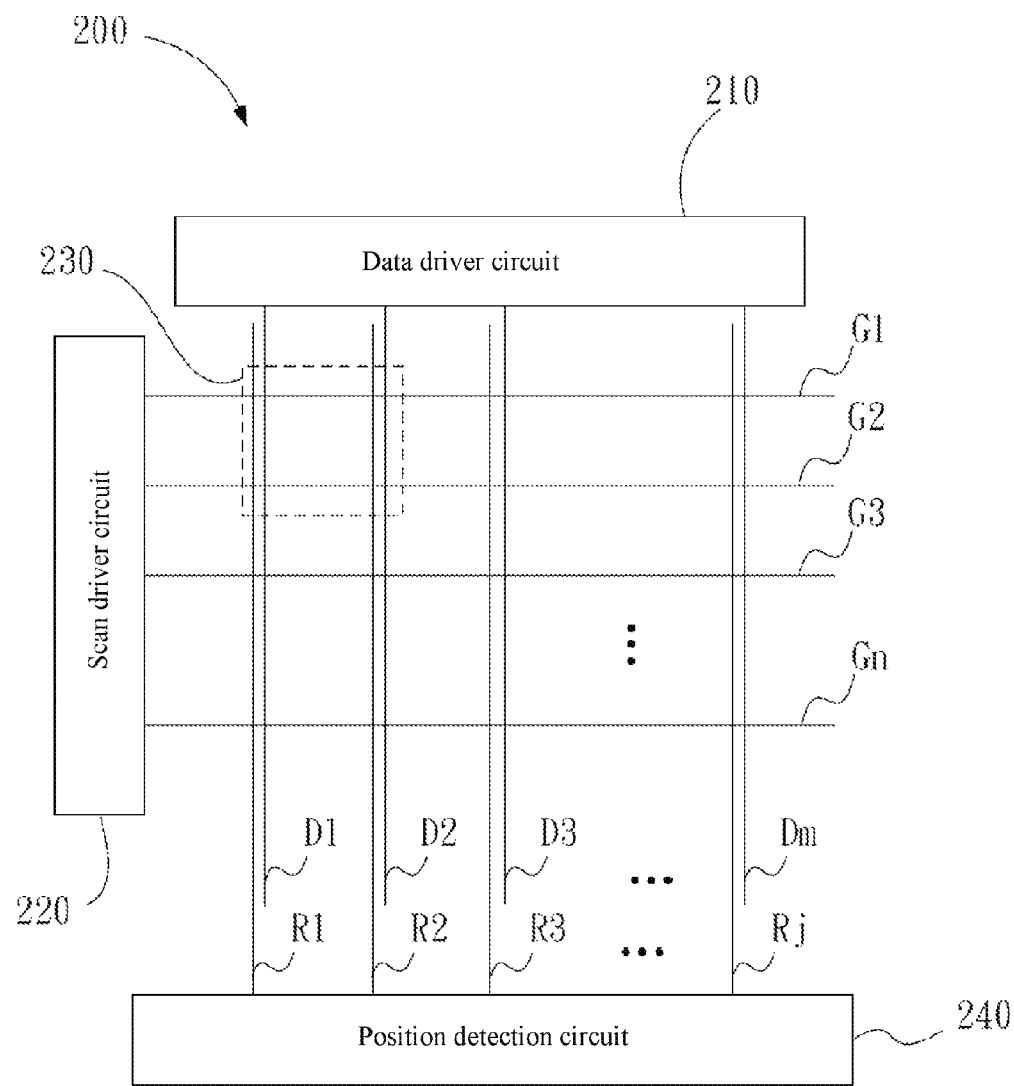
FIG. 6 is a simplified schematic view of an optical touch display panel according to an embodiment.

FIG. 6 is a simplified schematic view of an optical touch display panel 200 according to an embodiment.

The optical touch display panel 200 includes a data driving circuit 210, a scan driving circuit 220, a plurality of data signal lines Dm (that is, D1, D2, D3 . . . Dm, where m is a positive integer), a plurality of scan signal lines Gn (that is, G1, G2, G3 . . . Gn, where n is a positive integer), and a plurality of pixel regions 230 defined by the scan signal lines Gn and the data signal lines Dm. The pixel regions 230 are arranged in a matrix. The data driving circuit 210 is connected electrically to the data signal lines Dm. The scan driving circuit 220 is connected electrically to the scan signal lines Gn.

Herein, the scan signal lines Gn are arranged along a first direction and extend toward a second direction, while the data signal lines Dm are arranged along the second direction and extend toward the first direction. In addition, the first direction is perpendicular to the second direction. In other words, the data signal lines Dm and the scan signal lines Gn are provided to intersect each other in a perpendicular direction.

Figure 7:
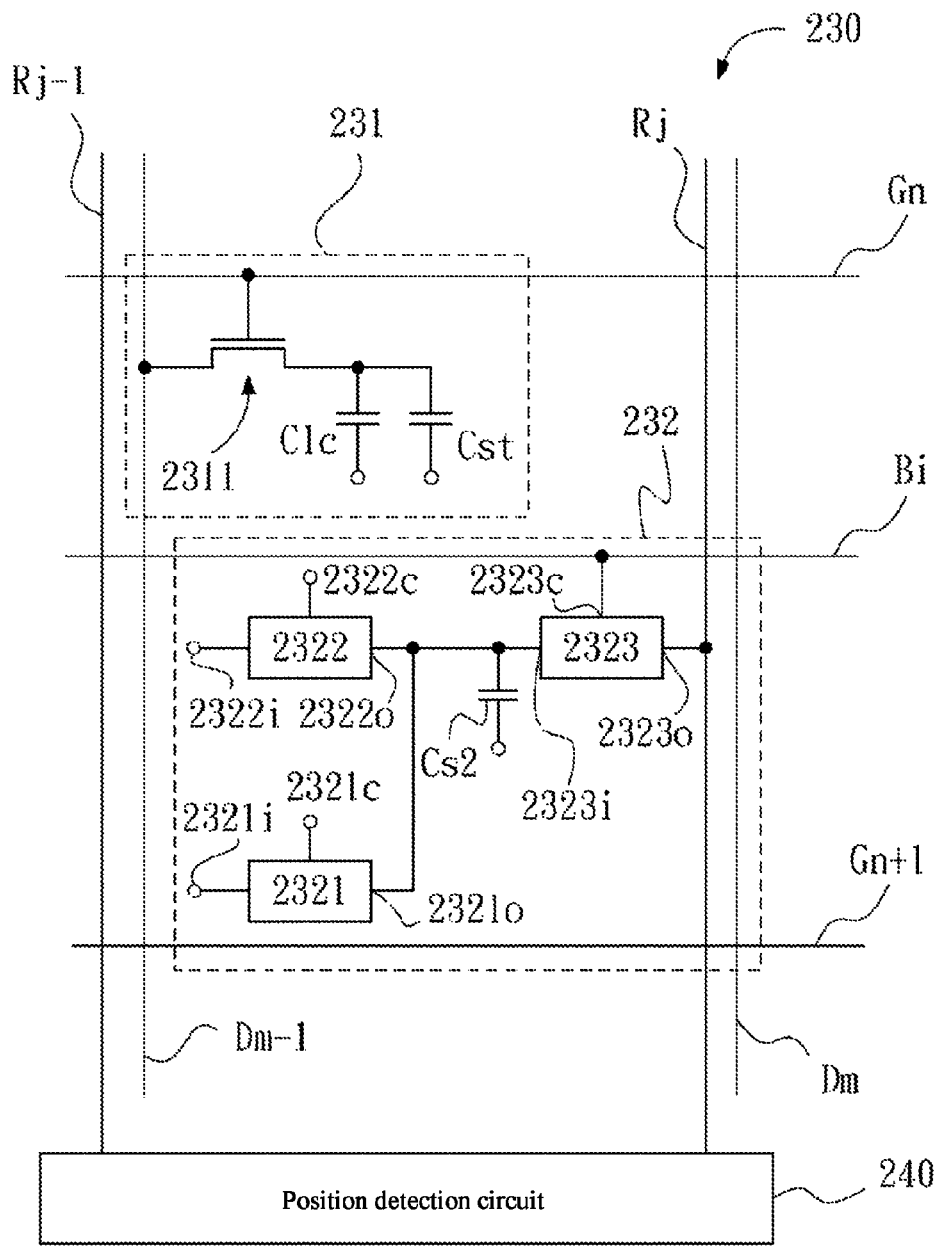
FIG. 7 is a schematic view of an equivalent circuit of a pixel region according to an embodiment.

FIG. 7 is a schematic view of an equivalent circuit of a pixel region 230 according to an embodiment.

As shown in FIG. 7, each pixel region 230 includes a pixel unit 231 and a light-sensing touch unit 232. The pixel unit 231 is used for displaying an image and the light-sensing touch unit 232 is used for detecting a touch event.

The pixel unit 231 includes a TFT 2311 used for control, a storage capacitor Cst, and a liquid crystal capacitor Clc formed by a pixel electrode and a common electrode. A gate of the TFT 2311 is connected to a scan signal line Gn, and a drain thereof is connected to a data signal line Dm. A scan signal from the scan driving circuit 220 transmitted through the scan signal line Gn can be used to control whether the TFT 2311 is in an on state, so that an image signal transmitted by the data driving circuit 210 can be written into the pixel region 230 through the data signal line Dm. Herein, a structure and a working principle of the pixel unit 231 are known to persons skilled in the art and are not described herein again.

A structure and a working principle of the light-sensing touch unit 232 are illustrated in the following. FIG. 7 shows a simplified circuit of a light-sensing touch unit 232 according to an embodiment. The light-sensing touch unit 232 includes a light-sensing component 2321, a storage capacitor Cs2, a charging component 2322, and a signal reading component 2323.

The light-sensing component 2321 senses a light source, and generates a sensing signal. The storage capacitor Cs2 is connected electrically to the light-sensing component 2321 and is used for storing the sensing signal. The signal reading component 2323 is connected electrically to the storage capacitor Cs2 and is used for reading a voltage of the storage capacitor Cs2 to generate a reading signal. The charging component 2322 is connected electrically to the storage capacitor Cs2 and is used for charging the storage capacitor Cs2 to reset an electric charge record of the storage capacitor Cs2 (that is, the voltage of the storage capacitor Cs2).

In a specific application example, the light-sensing component 2321 may include at least one TFT. The light-sensing component 2321 includes a first control-end 2321c, a first input-end 2321i, and a first output-end 2321o. The light-sensing component 2321 is irradiated by a light source and correspondingly outputs a sensing signal from the first output-end 2321o. The sensing signal may be a photo-electric current. The first output-end 2321o of the light-sensing component 2321 is connected electrically to the storage capacitor Cs2, so the generated photo-electric current changes the voltage of the storage capacitor Cs2 (if the photo-electric current flows from the storage capacitor Cs2 to the first output-end 2321o, the voltage of the storage capacitor Cs2 decreases). By using the signal reading component 2323 to read the voltage of the storage capacitor Cs2, an extent to which the light-sensing component 2321 is irradiated can be known, and accordingly, whether a touch event occurs on the pixel region 230 can be determined.

Herein, the signal reading component 2323 may also be implemented through a TFT. The signal reading component 2323 includes a third control-end 2323c (for example, a gate of the TFT), a third input-end 2323i (for example, a source of the TFT), and a third output-end 2323o (for example, a drain of the TFT). The third input-end 2323i is connected electrically to the storage capacitor Cs2 and is used for reading the voltage of the storage capacitor Cs2 and outputting a reading result (the reading signal), from the third output-end 2323o. The third control-end 2323c receives a third control signal and determines, according to the third control signal, whether to read the voltage of the storage capacitor Cs2.

In a specific application example, the charging component 2322 is similar to the light-sensing component 2321 and may also include at least one TFT. The charging component 2322 includes a second control-end 2322c, a second input-end 2322i, and a second output-end 2322o. The second output-end 2322o is connected electrically to the storage capacitor Cs2. The charging component 2322 receives a second reset signal through the second input-end 2322i, and according to a second control signal received by the second control-end 2322c thereof, the charging component 2322 correspondingly outputs a second charging signal from the second output-end 2322o. Therefore, the charging signal may be used to charge the storage capacitor Cs2, thereby resetting the voltage of the storage capacitor Cs2, where the voltage of the storage capacitor Cs2 is changed because of the photo-electric current.

Herein, the light-sensing component 2321 also receives a first reset signal through the first input-end 2321i and outputs, according to a first control signal received by the first control-end 2321c thereof, a first charging signal from the first output-end 2321o, so as to charge the storage capacitor Cs2. Therefore, with the light-sensing component 2321 and the charging component 2322 simultaneously charging the storage capacitor Cs2 in a reset time, the storage capacitor Cs2 can resume a high enough voltage level in the reset time, which eliminates the situation of false detection caused by a low reset voltage level.

As shown in FIG. 7, the optical touch display panel 200 also includes a position detecting circuit 240, a plurality of bias lines Bi (that is, B1, B2 . . . Bi, where i is a positive integer), and a plurality of reading signal lines Rj (that is, R1, R2, R3 . . . Rj, where j is a positive integer), connected to the position detecting circuit 240.

The bias lines Bi are provided parallel to the scan signal lines Gn, and the same bias lines Bi may electrically connect the signal reading component 2323 in pixel regions 230 arranged along the second direction. Likewise, the reading signal lines Rj are provided parallel to the data signal lines Dm, and the same reading signal lines Rj may electrically connect the signal reading component 2323 in pixel regions 230 arranged along the first direction.

As shown in FIG. 7, the third control-end 2323c of the light-sensing component 2321 is connected electrically to the bias line Bi, so as to receive the third control signal. The third control signal may be provided by a control circuit (not shown). The third output-end 2323o of the light-sensing component 2321 is connected electrically to a reading signal line Rj, so as to output a reading signal to the position detecting circuit 240.

The position detecting circuit 240 may compare the voltage value of the reading signal with a predetermined threshold value, so as to determine whether a touch event occurs on the pixel region 230. For example, the voltage value of the reading signal may be compared with a dark state voltage V1. In other words, the position detecting circuit 240 may determine, according to a reading signal output by a light-sensing touch unit 232, whether a touch point on the optical touch display panel 200 is touched.

Figure 8:
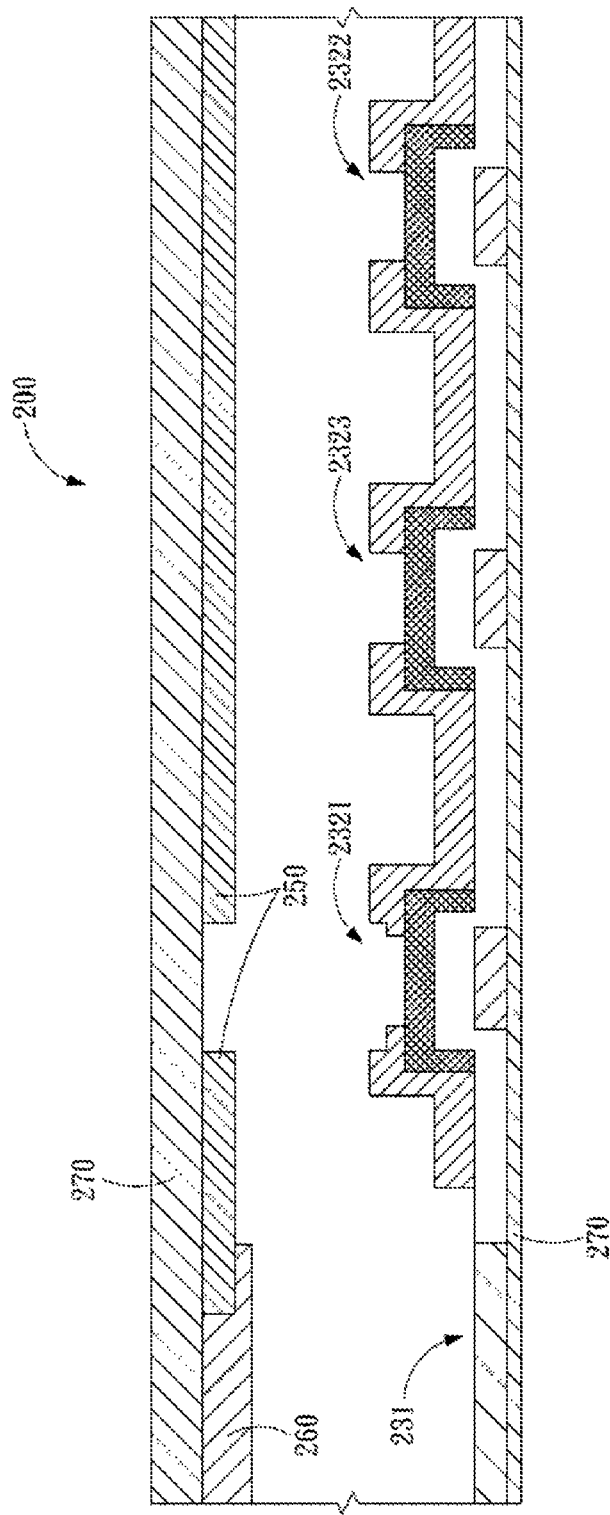
FIG. 8 is a schematic partial sectional view of an optical touch display panel according to an embodiment.

FIG. 8 is a schematic partial sectional view of an optical touch display panel 200 according to an embodiment.

As shown in FIG. 8, the optical touch display panel 200 includes a shielding component 250 provided on a light receiving path between the charging component 2322 and a light source, in the light-sensing touch unit 232. In other words, the shielding component 250 is used for shielding the charging component 2322, so that the charging component 2322 is not irradiated by the light source and does not generate a sensing signal. Likewise, the signal reading component 2323 is also shielded by the shielding component 250. Therefore, in the light-sensing touch unit 232, only the light-sensing component 2321 may be irradiated by the light source and generate a sensing signal. In the reset time, apart from the light-sensing component 2321, the charging component 2322 may also charge the storage capacitor Cs2. Herein, the shielding component 250 may be a black matrix or a color filter 260.

As shown in FIG. 8, the optical touch display panel 200 also includes a color filter 260, which is provided corresponding to the pixel unit 231. A structure and a working principle of a liquid crystal display panel, such as the color filter 260, a substrate 270, an alignment film, liquid crystal, a polarizer, and a backlight module, are all known to persons skilled in the art and are not described herein again.

Figure 9:
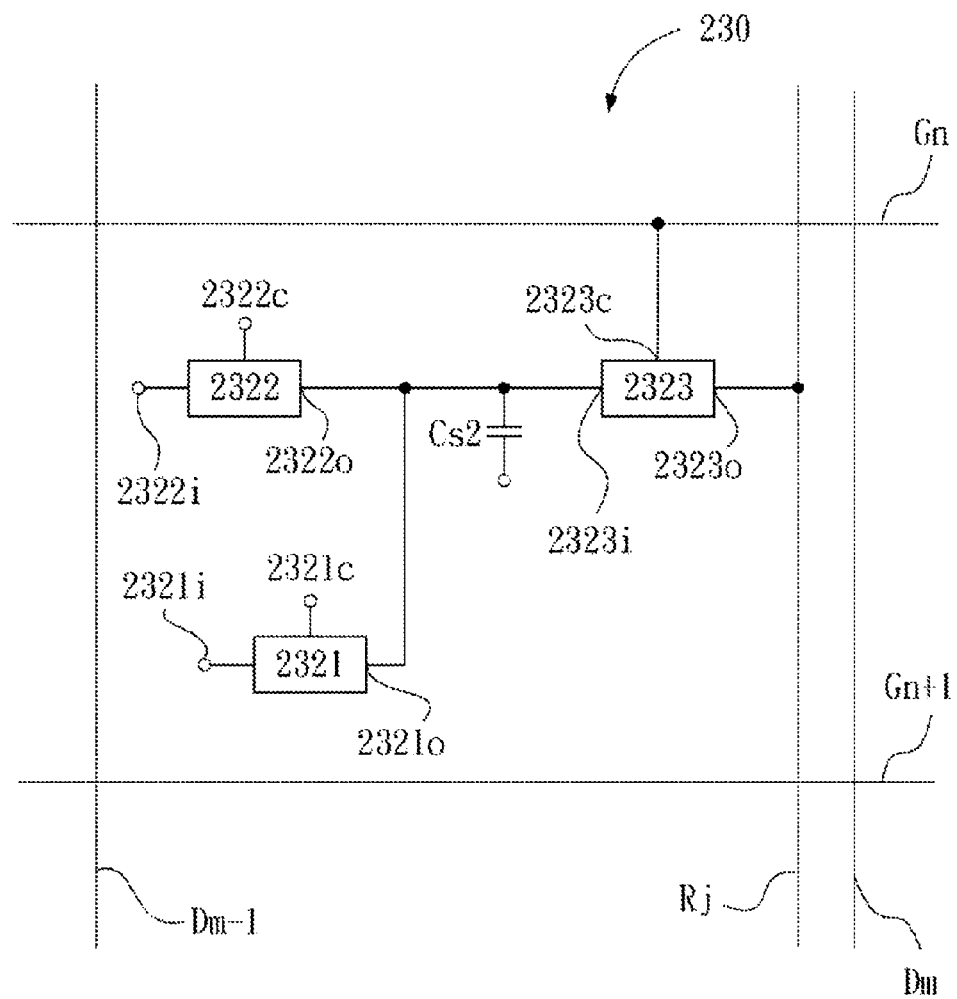
FIG. 9 is a schematic view of another equivalent circuit of a pixel region according to an embodiment.

FIG. 9 is a schematic view of another equivalent circuit of a pixel region 230 according to an embodiment.

Please refer to FIG. 9, FIG. 9 is approximately the same as FIG. 7, and the pixel unit 231 and the position detecting circuit 240 are omitted in FIG. 9. In the signal reading component 2323 shown in FIG. 9, the third control-end 2323c is connected electrically to the scan signal line Gn other than the bias line Bi shown in FIG. 7. In other words, the scan signal line Gn may replace the bias line Bi and be used for not only controlling the pixel unit 231 but also providing the third control signal to trigger an action of touch detection.

FIG. 10A shows a first embodiment of light-sensing touch units 232 according to an embodiment.

As shown in FIG. 10A, a second control-end 2322c of a charging component 2322 of each light-sensing touch unit 232 is connected electrically to a scan signal line Gn+1, and a first control-end 2321c of a light-sensing component 2321 of the same light-sensing touch unit 232 is also connected electrically to the scan signal line Gn+1, so that the second control-end 2322c and the first control-end 2321c receive the same control signal. Herein, in FIG. 10A, only two light-sensing touch units 232 are used to schematically represent that the light-sensing touch units 232 arranged along the same second direction (that is, an extending direction of the scan signal line Gn), can all be connected to the same scan signal lines Gn and Gn+1 and a reset signal line Sn+1.

The second control-end 2322c of the charging component 2322 of each light-sensing touch unit 232 is connected electrically to the first control-end 2321c of the light-sensing component 2321 of the same light-sensing touch unit 232, so as to output, according to the received control signal, a second charging signal to the storage capacitor Cs2 to charge the storage capacitor Cs2. At the same time, the light-sensing component 2321 of the same light-sensing touch unit 232 outputs, according to the control signal received through the first control-end 2321c, a first charging signal to the storage capacitor Cs2 to simultaneously charge the storage capacitor Cs2

In this embodiment, the charging component 2322 may be a TFT, with the second control-end 2322c corresponding to a gate of the TFT, the second input-end 2322i corresponding to a source of the TFT, and the second output-end 2322o corresponding to a drain of the TFT. However, the embodiment is not limited to a single TFT and the charging component 2322 may also be implemented through a plurality of TFTs.

As shown in FIG. 10A, a third control-end 2323c of a signal reading component 2323 (a gate of a TFT), of each light-sensing touch unit 232 is connected electrically to a first signal line (that is, the scan signal line Gn), in the scan signal lines Gn, and a first control-end 2321c of a light-sensing component 2321 of the same light-sensing touch unit 232 is connected electrically to a second signal line (that is, a scan signal line Gn+1), adjacent to the first signal line in the scan signal lines Gn.

Herein, the first input-end 2321i of the light-sensing component 2321 and the second input-end 2322i of the charging component 2322 are both connected electrically to the same reset signal line Sn+1, so as to receive the same reset signal. The first output-end 2321o outputs a first charging signal corresponding to the reset signal, and the second output-end 2322o also outputs a second charging signal corresponding to the reset signal.

In some embodiments, any scan signal line Gn (for example, Gn or Gn+1), or any bias line Bi that provides a direct current voltage can be used to electrically connect the first input-end 2321i and the second input-end 2322i.

Please refer to both FIG. 10A and FIG. 10B. FIG. 10B is a timing diagram of the scan signal lines Gn and Gn+1 and the reset signal line Sn+1 shown in FIG. 10A.

First, the scan signal line Gn provides a pulse for the third control-ends 2323c of the signal reading components 2323, so that the third input-ends 2323i and the third output-ends 2323o are connected. Consequently, reading signals are respectively transmitted through reading signal lines Rj and Rj+1 to the position detecting circuit 240, so that the position detecting circuit 240 can accordingly determine a touch position (that is, determining whether the position of a corresponding light-sensing touch unit 232 is a touch point according to a voltage level of a reading signal transmitted through a reading signal line Rj).

Next, the scan signal line Gn+1 further provides a pulse for the first control-end 2321c of the light-sensing component 2321 and the second control-end 2322c of the charging component 2322, so that the first input-end 2321i and the first output-end 2321o of the light-sensing component 2321 are connected and the second input-end 2322i and the second output-end 2322o of the charging component 2322 are also connected. Meanwhile, the reset signal line Sn+1 also provides a pulse for the first input-end 2321i of the light-sensing component 2321 and the second input-end 2322i of the charging component 2322. Therefore, the storage capacitor Cs2 receives charging signals provided by the light-sensing component 2321 and the charging component 2322, and is charged to reset the electric charge record.

In the embodiment shown in FIG. 10A, the light-sensing component 2321 is implemented through two serially connected TFTs. However, the embodiment is not limited thereto, and a single TFT or more than two TFTs may also be used to implement the light-sensing component 2321.

Figure 10C:
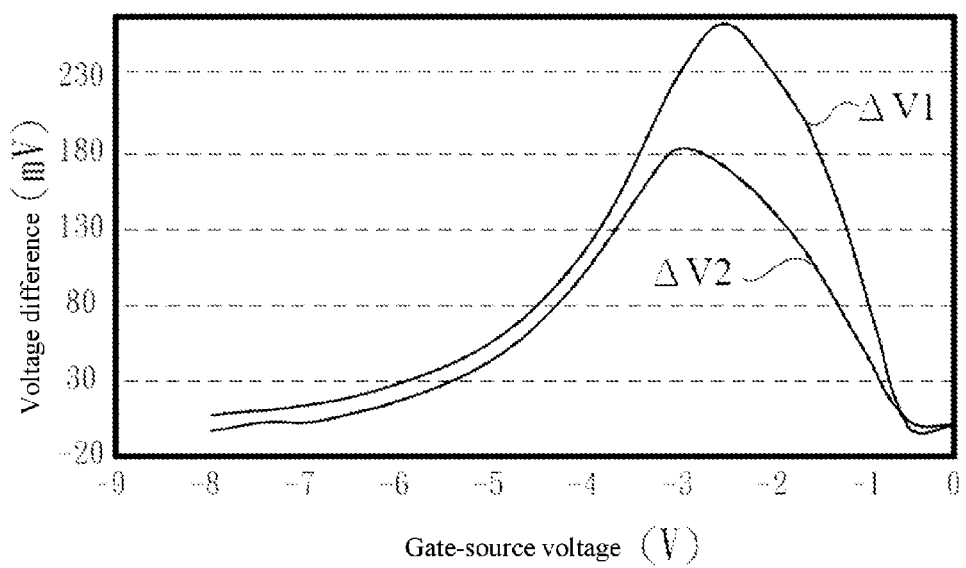
FIG. 10C is a schematic view of correspondence between a reading signal of a light-sensing touch unit shown in FIG. 10A and a voltage difference of a reference voltage.

FIG. 10C is a schematic view of correspondence between a reading signal of the light-sensing touch unit 232 shown in FIG. 10A and a voltage difference ΔV of a reference voltage, where the voltage difference ΔV is a difference value between a voltage level of a first end Va of the storage capacitor Cs2 and the reference voltage. As shown in FIG. 10C, in a situation of a signal (that is, a gate-source voltage Vgs), transmitted through various scan signal lines Gn+1 and reset signal lines Sn+1, a comparison between a voltage difference ΔV1 of the light-sensing touch unit 232 shown in FIG. 10A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Figure 11A:
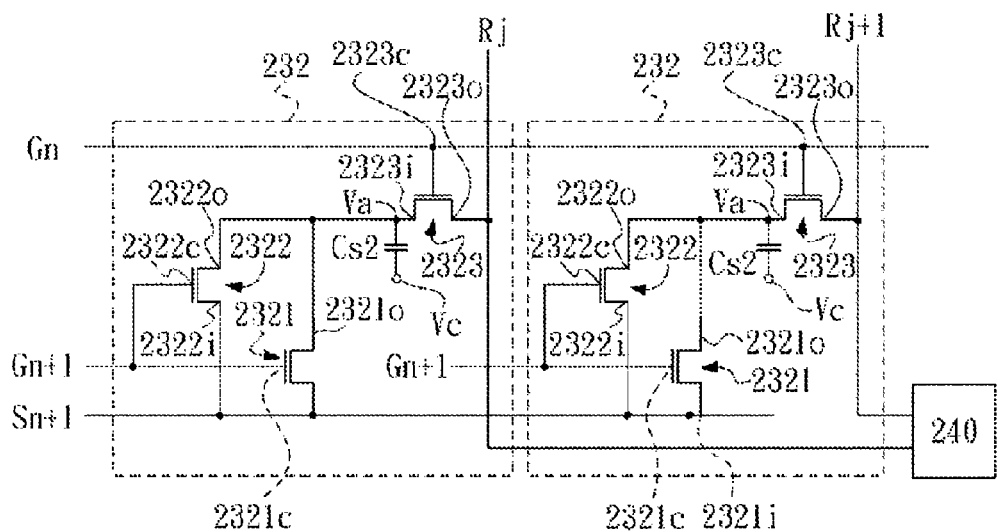
FIG. 11A shows a second embodiment of light-sensing touch units according to an embodiment.

FIG. 11A shows a second embodiment of light-sensing touch units 232 according to an embodiment.

As shown in FIG. 11A, compared with the light-sensing component 2321 implemented through two TFTs as shown in FIG. 10A, in this embodiment, the light-sensing component 2321 is implemented through a single TFT. The first control-end 2321c of the light-sensing component 2321 is a gate of the TFT, the first input-end 2321i of the light-sensing component 2321 is a source of the TFT, and the first output-end 2321o of the light-sensing component 2321 is a drain of the TFT. A working principle of the light-sensing touch units 232 shown in FIG. 11A can be obtained with reference to relevant description of FIG. 10A and FIG. 10B, which is not described herein again.

Figure 11B:
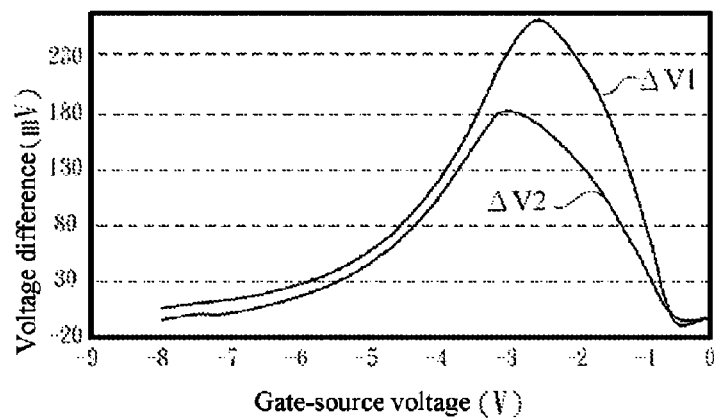
FIG. 11B is a schematic view of correspondence between a reading signal of a light-sensing touch unit shown in FIG. 11A and a voltage difference of a reference voltage.

FIG. 11B is a schematic view of correspondence between a reading signal of the light-sensing touch unit 232 shown in FIG. 11A and a voltage difference ΔV of a reference voltage, where the voltage difference ΔV is a difference value between the voltage level of the first end Va of the storage capacitor Cs2 and the reference voltage. As shown in FIG. 11B, in a situation of various signals (that is, the gate-source voltage Vgs), transmitted through the scan signal line Gn+1 and reset signal lines Sn+1, a comparison between a voltage difference ΔV1 of the light-sensing touch unit 232 shown in FIG. 11A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

FIG. 12A shows a third embodiment of light-sensing touch units 232 according to an embodiment. FIG. 12B is a timing diagram of scan signal lines Gn, Gn+1, and Gn+2 and a reset signal line Sn+1 shown in FIG. 12A.

As shown in FIG. 12A, in this embodiment, a first control-end 2321c of a light-sensing component 2321 of a light-sensing touch unit 232 is connected electrically to the scan signal line Gn+1, and a second control-end 2322c of a charging component 2322 thereof is connected electrically to the scan signal line Gn+2. In other words, the second control-end 2322c of the charging component 2322 is connected electrically to a first control-end 2321c of a light-sensing component 2321 of a light-sensing touch unit 232 (not shown) adjacent thereto in the first direction. According to a received control signal, the second control-end 2322c of the charging component 2322 outputs a second charging signal to a storage capacitor Cs2 to charge the storage capacitor Cs2.

Herein, a third control-end 2323c of a signal reading component 2323 (a gate of a TFT) of each light-sensing touch unit 232 is connected electrically to a first signal line of successively adjacent first signal line (that is, the scan signal line Gn), second signal line (that is, the scan signal line Gn+1), and third signal line (that is, the scan signal line Gn+2), in the scan signal lines Gn. A first control-end 2321c of a light-sensing component 2321 of each light-sensing touch unit 232 is connected electrically to the second signal line. A second control-end 2322c of a charging component 2322 (a gate of a TFT), of each light-sensing touch unit 232 is connected electrically to the third signal line.

Please refer to both FIG. 12A and FIG. 12B. When the signal reading component 2323 receives a third control signal via the scan signal line Gn, the signal reading component 2323 reads a voltage of the storage capacitor Cs2 (that is, a voltage level of a first end Va of the storage capacitor Cs2), and transmits the read voltage via a reading signal line Rj to the position detecting circuit 240. After that, the light-sensing component 2321 and the charging component 2322 respectively and successively receive a first control signal transmitted via the scan signal line Gn+1 and a second control signal transmitted via the scan signal line Gn+2 to successively charge the storage capacitor Cs2.

Herein, a first output-end 2321o of the light-sensing component 2321 and a second output-end 2322o of the charging component 2322 are connected electrically to a storage capacitor Cs2 of the same light-sensing touch unit 232. A first input-end 2321i of the light-sensing component 2321 receives a first reset signal and a second input-end 2322i of the charging component 2322 receives a second reset signal. The first output-end 2321o outputs a first charging signal corresponding to the first reset signal, and the second output-end 2322o outputs a second charging signal corresponding to the second reset signal. Herein, the light-sensing component 2321 is implemented through two serially connected TFTs, but the embodiment is not limited thereto. The light-sensing component 2321 may also be implemented through a single TFT or more than two TFTs.

As shown in FIG. 12A, the charging component 2322 may be implemented through a TFT. In other words, the second control-end 2322c of the charging component 2322 may be a gate of the TFT, the second input-end 2322i thereof may be a source of the TFT, and the second output-end 2322o thereof may be a drain of the TFT. However, the embodiment is not limited to a single TFT and the charging component 2322 may also be implemented through a plurality of TFTs.

As shown in FIG. 12A, the first input-end 2321i and the second input-end 2322i are connected electrically to the same reset signal line Sn+1, so that they receive the same reset signal. However, the embodiment is limited to that the first input-end 2321i and the second input-end 2322i being connected electrically to the same reset signal line Sn+1, and one of the first input-end 2321i and the second input-end 2322i may also be connected electrically to the first control-end 2321c, the second control-end 2322c, the first signal line, the second signal line, or the third signal line.

Figure 12C:
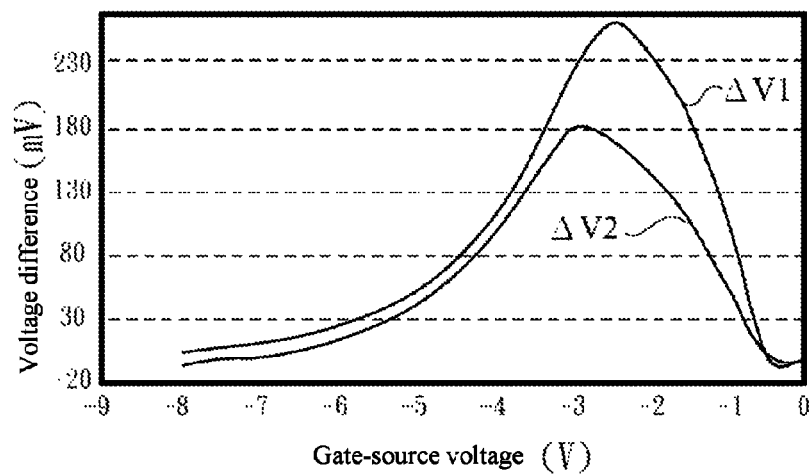
FIG. 12C is a schematic view of correspondence between a reading signal of a light-sensing touch unit shown in FIG. 12A and a voltage difference of a reference voltage.

FIG. 12C is a schematic view of correspondence between a reading signal of the light-sensing touch unit 232 shown in FIG. 12A and a voltage difference ΔV of a reference voltage, where the voltage difference ΔV is a difference value between a voltage level of a first end Va of the storage capacitor Cs2 and the reference voltage. As shown in FIG. 12C, in a situation of various signals (that is, a gate-source voltage Vgs), transmitted through a scan signal line Gn+1 and a reset signal line Sn+1, a comparison between a voltage difference ΔV1 of the light-sensing touch unit 232 shown in FIG. 12A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Figure 13:
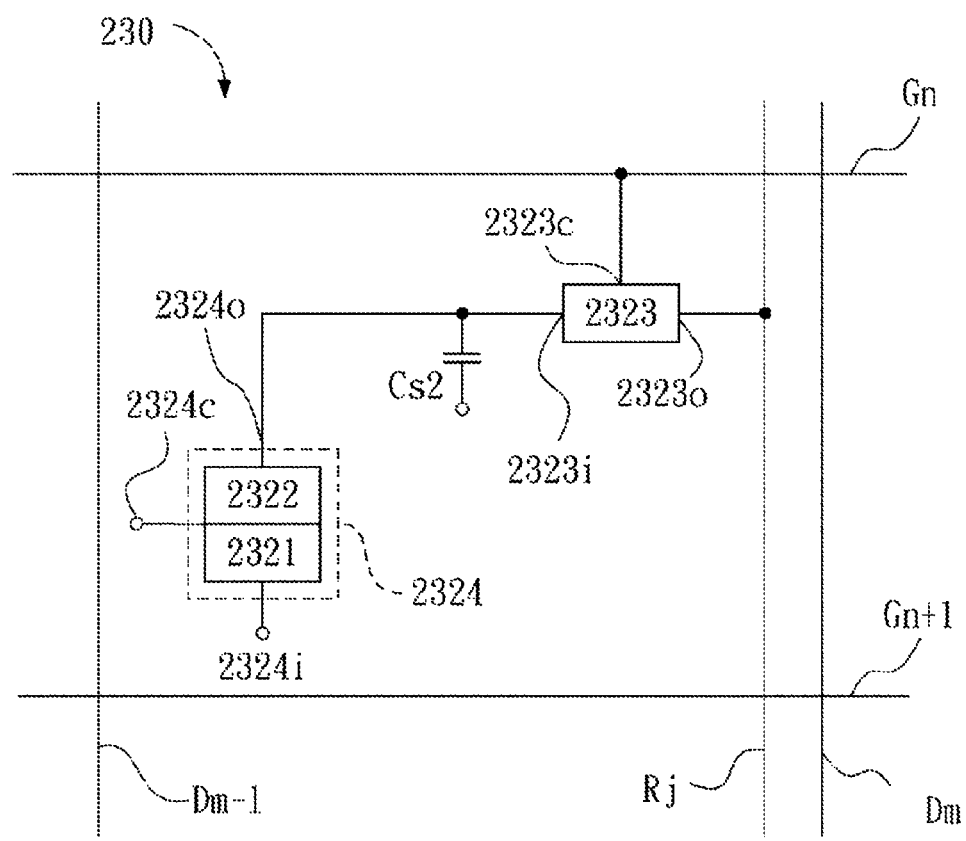
FIG. 13 is a schematic view of another equivalent circuit of a pixel region according to an embodiment.

FIG. 13 is a schematic view of another equivalent circuit of a pixel region 230 according to an embodiment.

Please refer to FIG. 13, which is approximately the same as FIG. 9. The pixel unit 231 and the position detecting circuit 240 shown in FIG. 7 are also omitted in FIG. 13. A difference between FIG. 13 and FIG. 9 is that the light-sensing component 2321 and the charging component 2322 shown in FIG. 13 may be combined into a light-sensing transistor component 2324, which has a fourth input-end 2324i for receiving a reset signal and a fourth control-end 2324c for receiving a control signal. In addition, the light-sensing transistor component 2324 also has a fourth output-end 2324o for outputting, according to the control signal, a charging signal corresponding to the reset signal to the storage capacitor Cs2. In other words, while a charging path different from the light-sensing component 2321 is provided in FIG. 9, the light-sensing transistor component shown in FIG. 13 includes a charging path attached to the light-sensing component 2321.

Herein, the light-sensing transistor component 2324 may be implemented through a plurality of TFTs and an embodiment thereof is described below.

Figure 14A:
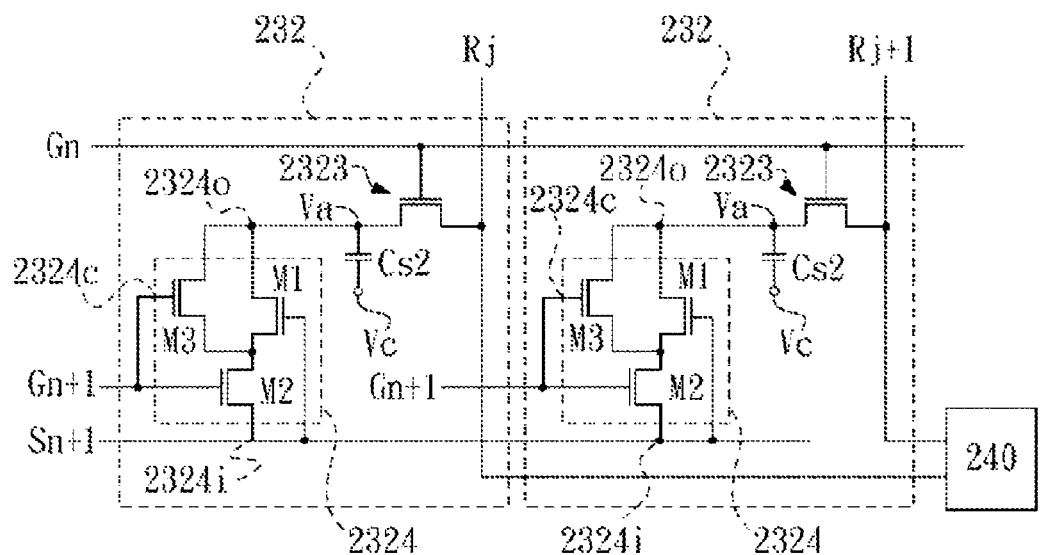
FIG. 14A shows a fourth embodiment of light-sensing touch units according to an embodiment.

FIG. 14A shows a fourth embodiment of light-sensing touch units 232 according to an embodiment.

As shown in 14A, the light-sensing touch unit 232 is approximately the same as the light-sensing touch unit 232 shown in FIG. 10A. TFTs M1 and M2 are serially connected to form a light-sensing component 2321 as shown in FIG. 10A and a TFT M3 forms a charging component 2322 as shown in FIG. 10A. A gate of the TFT M1 and a source of the TFT M2 are connected electrically to a reset signal line Sn+1. A gate of the TFT M2 and a gate of the TFT M3 are both connected to the scan signal line Gn+1. A drain of the TFT M3 is connected electrically to a drain of the TFT M1.

A difference between FIG. 14A and FIG. 10A is that a source of the TFT M3 shown in FIG. 14A connects the TFTs M1 and M2. That is, the source of the TFT M3 is connected electrically to a source of the TFT M1 and a drain of the TFT M2. However, when signals shown in FIG. 10B are provided, the light-sensing component 2321 and the charging component 2322 can charge a storage capacitor Cs2 at the same time.

Figure 14B:
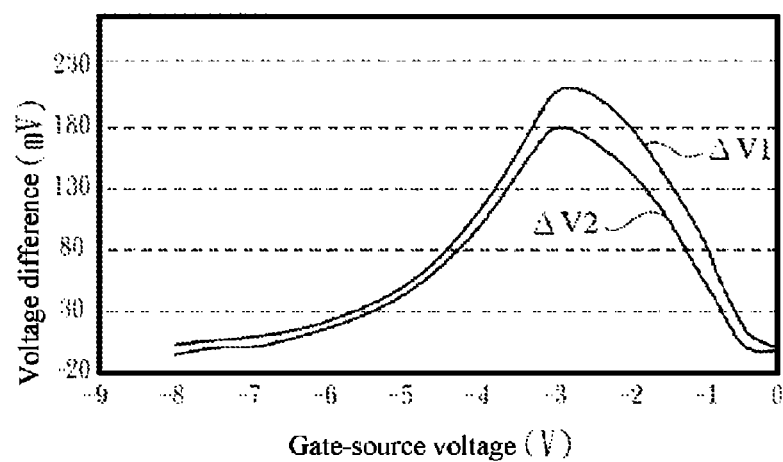
FIG. 14B is a schematic view of correspondence between a reading signal of a light-sensing touch unit shown in FIG. 14A and a voltage difference of a reference voltage.

FIG. 14B is a schematic view of correspondence between a reading signal of the light-sensing touch unit 232 shown in FIG. 14A and a voltage difference ΔV of a reference voltage, where the voltage difference ΔV is a difference value between the voltage level of the first end Va of the storage capacitor Cs2 and the reference voltage. As shown in FIG. 14B, in a situation of a signal (that is, a gate-source voltage Vgs), transmitted through various scan signal lines Gn+1 and reset signal lines Sn+1, a comparison between a voltage difference ΔV1 of the light-sensing touch unit 232 shown in 14A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Figure 15A:
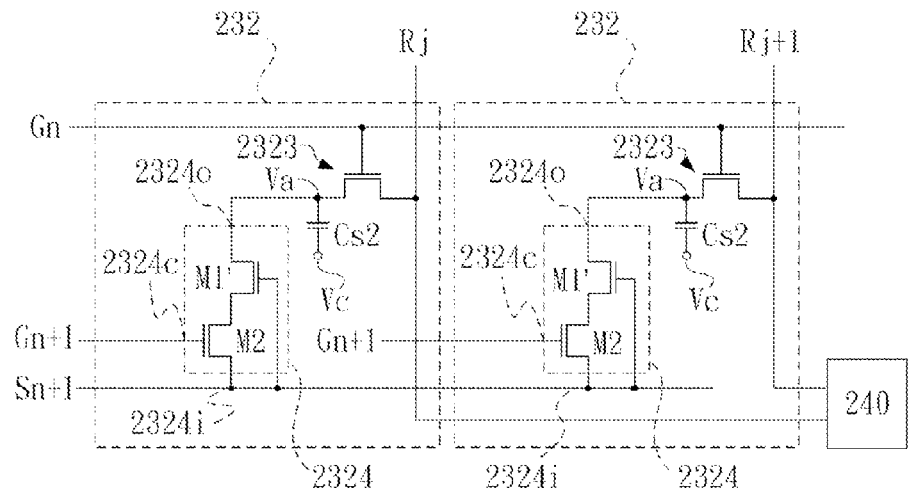
FIG. 15A shows a variation of a light-sensing transistor component shown in FIG. 14A.

FIG. 15A shows a variation of the light-sensing transistor component 2324 shown in FIG. 14A. As shown in FIG. 15A, the TFTs M1 and M3 shown in FIG. 14A can be combined and implemented through a TFT Mr. Meanwhile, a certain light-sensing region of the TFT M1' is shielded by the shielding component 250, so that the light-sensing transistor component 2324 has an illuminated area and a light-sensing area smaller than the illuminated area. The light-sensing transistor component 2324 senses a light source according to the illuminated area, and generates a sensing signal. Though a charging signal generated by the light-sensing transistor component 2324 is fixed, the sensing signal can be reduced by reducing the illuminated area, thereby achieving the effect of adding the charging component 2322 (the sensing signal is fixed while the charging signal increases).

Figure 15B:
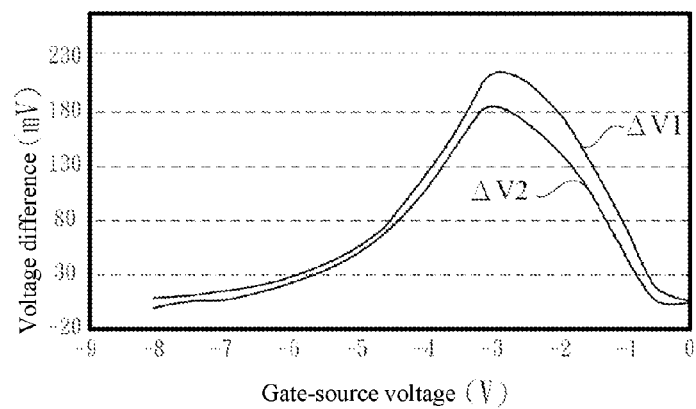
FIG. 15B is a schematic view of correspondence between a reading signal of a light-sensing touch unit 232 shown in FIG. 15A and a voltage difference $\Delta V$ of a reference voltage.

FIG. 15B is a schematic view of correspondence between a reading signal of the light-sensing touch unit 232 shown in FIG. 15A and a voltage difference ΔV of a reference voltage, where the voltage difference ΔV is a difference value between the voltage level of the first end Va of the storage capacitor Cs2 and the reference voltage. As shown in FIG. 15B, in a situation of a signal (that is, the gate-source voltage Vgs), transmitted through various scan signal lines Gn+1 and reset signal lines Sn+1, a comparison between a voltage difference ΔV1 of the light-sensing touch unit 232 shown in FIG. 15A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Figure 16A:
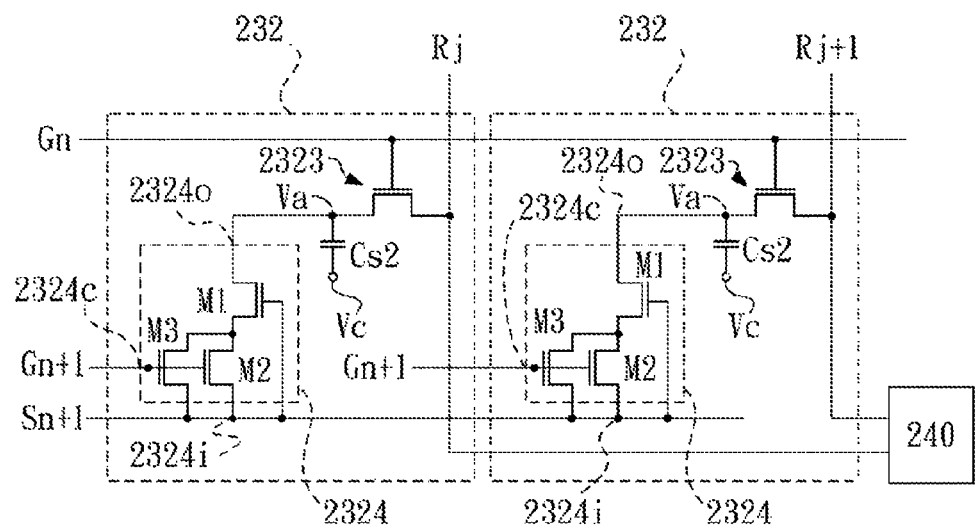
FIG. 16A shows a fifth embodiment of light-sensing touch units according to an embodiment.

FIG. 16A shows a fifth embodiment of light-sensing touch units 232 according to an embodiment.

FIG. 16A is approximately the same as FIG. 14A. A difference between them is that the drain of the TFT M3 is connected electrically to the source of the TFT M1 and the drain of the TFT M2, and the source of the TFT M3 is connected electrically to the reset signal line Sn+1. However, when signals shown in FIG. 10B are provided, the light-sensing component 2321 (that is, the TFTs M1 and M2), and the charging component 2322 (that is, the TFT M3), may charge the storage capacitor Cs2 at the same time.

Figure 16B:
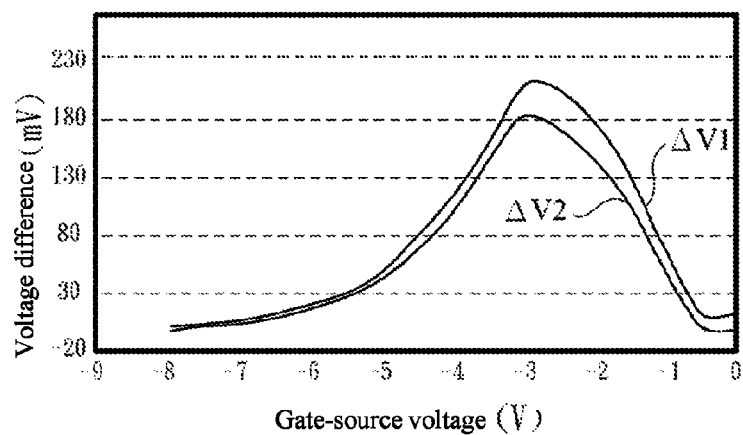
FIG. 16B is a schematic view of correspondence between a reading signal of a light-sensing touch unit shown in FIG. 16A and a voltage difference of a reference voltage.

FIG. 16B is a schematic view of correspondence between a reading signal of the light-sensing touch unit 232 shown in FIG. 16A and a voltage difference ΔV of a reference voltage, where the voltage difference ΔV is a difference value between the voltage level of the first end Va of the storage capacitor Cs2 and the reference voltage. As shown in FIG. 16B, in a situation of a signal (that is, the gate-source voltage Vgs), transmitted through various scan signal lines Gn+1 and reset signal lines Sn+1, a comparison between a voltage difference ΔV1 of the light-sensing touch unit 232 shown in FIG. 16A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Figure 17A:
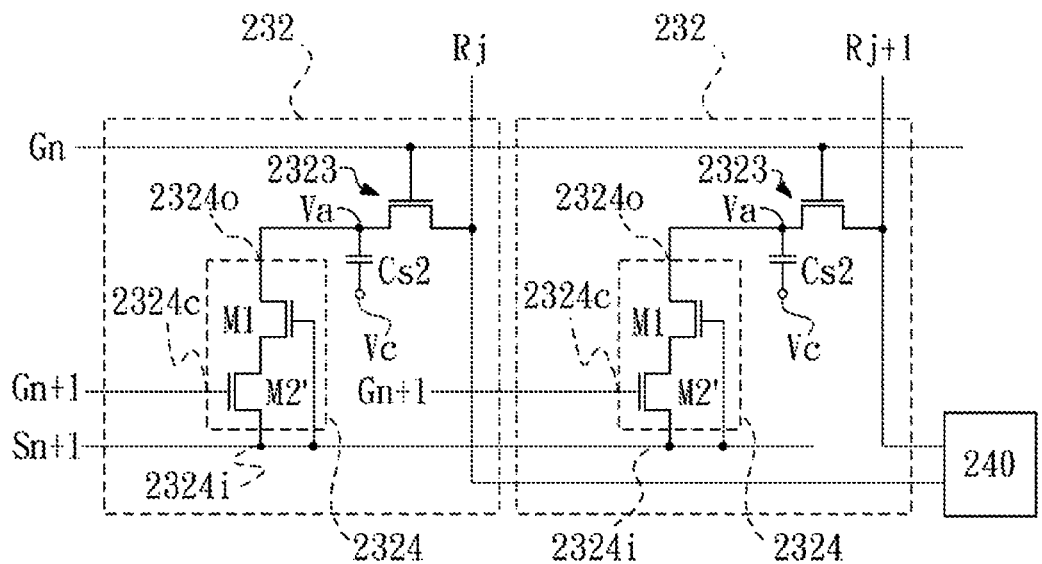
FIG. 17A shows a variation of a light-sensing transistor component shown in FIG. 16A.

FIG. 17A shows a variation of the light-sensing transistor component 2324 shown in FIG. 16A. As shown in FIG. 17A, the TFTs M2 and M3 shown in FIG. 16A can be combined and implemented through a TFT MT. Meanwhile, a certain light-sensing region of the TFT MT is shielded by the shielding component 250, so that the light-sensing transistor component 2324 has an illuminated area and a light-sensing area smaller than the illuminated area. The light-sensing transistor component 2324 senses a light source according to the illuminated area, and generates a sensing signal. Though a charging signal generated by the light-sensing transistor component 2324 is fixed, the sensing signal can be reduced by reducing the illuminated area, thereby achieving the effect of adding the charging component 2322 (the sensing signal is fixed while the charging signal increases).

Figure 17B:
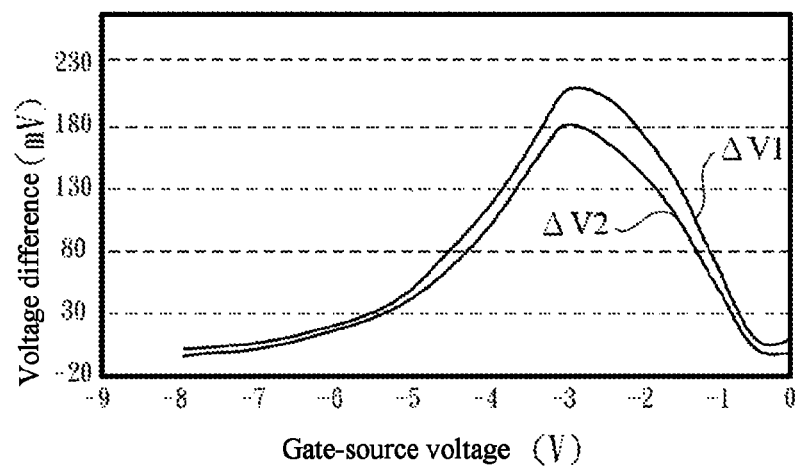
FIG. 17B is a schematic view of correspondence between a reading signal of a light-sensing touch unit shown in FIG. 17A and a voltage difference of a reference voltage.

FIG. 17B is a schematic view of correspondence between a reading signal of the light-sensing touch unit 232 shown in FIG. 17A and a voltage difference ΔV of a reference voltage, where the voltage difference ΔV is a difference value between the voltage level of the first end Va of the storage capacitor Cs2 and the reference voltage. As shown in FIG. 17B, in a situation of a signal (that is, the gate-source voltage Vgs), transmitted through various scan signal lines Gn+1 and reset signal lines Sn+1, a comparison between a voltage difference ΔV1 of the light-sensing touch unit 232 shown in FIG. 17A and a voltage difference ΔV2 when the charging component 2322 is absent is shown. It is clear that the level of a reset voltage is increased by adding the charging component 2322, so that a voltage difference ΔV of a higher level can be obtained. Herein, the reference voltage may be a preset value or may be dynamically adjusted.

Please refer to FIG. 17A, in which in some embodiments certain light-sensing regions of both the TFTs M1 and MT can be shielded, so that the light-sensing transistor component 2324 has an even smaller light-sensing area compared with the light-sensing transistor component 2324 shown in FIG. 17A, thereby increasing a reset voltage level of the storage capacitor Cs2.

The storage capacitor Cs2 in the above embodiments includes a first end Va and a second end Vc, where the first end Va is connected electrically to the light-sensing component 2322 and the signal reading component 2323. FIG. 10A is taken as an example for illustration in the following.

Figure 18:
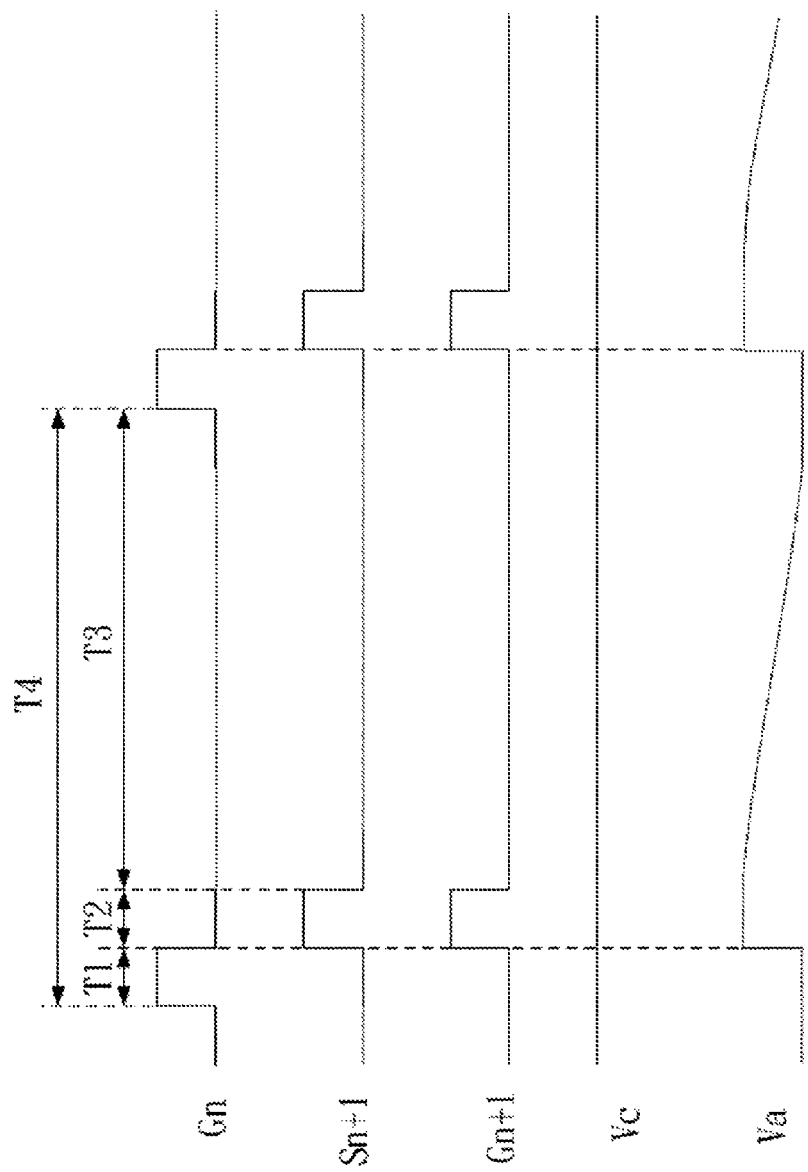
FIG. 18 is a timing diagram of scan signal lines, a reset signal line, and a first end and a second end of a storage capacitor shown in 10A.
Figure 19:
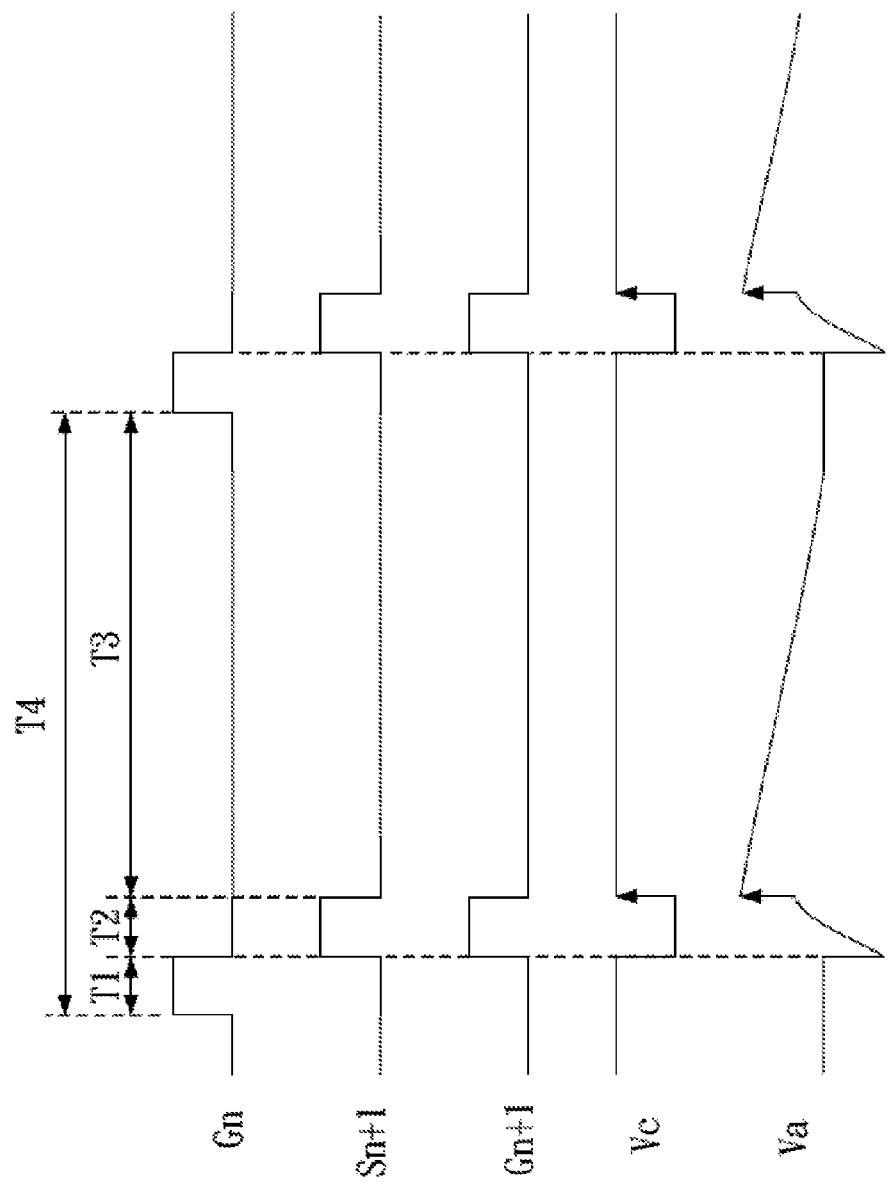
FIG. 19 is another timing diagram of scan signal lines, a reset signal line, and a first end and a second end of a storage capacitor shown in 10A.

FIG. 18 is a timing diagram of the scan signal lines Gn and Gn+1, the reset signal line Sn+1, and the first end Va and the second end Vc of the storage capacitor Cs2 shown in FIG. 10A. FIG. 19 is another timing diagram of the scan signal lines Gn and Gn+1, the reset signal line Sn+1, and the first end Va and the second end Vc of the storage capacitor Cs2 shown in FIG. 10A.

In some embodiments, referring to both FIG. 10A and FIG. 18, the signals of the scan signal lines Gn and Gn+1 and the reset signal line Sn+1 are described in the above and are not described herein again. It should be noted herein that, the second end Vc of the storage capacitor Cs2 receives a direct current signal of a high level, and after a reading time T1, the storage capacitor Cs2 is charged during a reset time T2, so that the voltage level of the first end Va is reset to a high level state. Next, during a sensing time, the light-sensing component 2321 generates a sensing signal (that is, a photo-electric current, which is also called a leakage current since the storage capacitor Cs2 is discharged thereby), and reads the voltage level of the first end Va of the storage capacitor Cs2 again in a next sensing period T4. Herein, the sensing period T4 is generally a display time of a frame.

In some embodiments, referring to both FIG. 10A and FIG. 19, the timing diagram shown in FIG. 19 is similar to that shown in FIG. 18. A difference between them is that the second end Vc of the storage capacitor Cs2 receives an alternating current signal in FIG. 19.

As shown in FIG. 19, before the scan signal line Gn+1 and the reset signal line Sn+1 reach a high level, the second end Vc of the storage capacitor Cs2 is at a low level. When the scan signal line Gn+1 and the reset signal line Sn+1 returns to a low level from the high level, the second end Vc of the storage capacitor Cs2 switches to a high level, so as to couple a signal to the first end Va of the storage capacitor Cs2, thereby elevating the voltage level of the first end Va. Therefore, compared with the signals shown in FIG. 18, the signals shown in FIG. 19 can be used to reset the voltage level of the first end Va to an even higher level state.

To summarize, the optical touch display panel according to the present invention can elevate the reset voltage level of the storage capacitor Cs2, thereby increasing the voltage difference ΔV between a dark state voltage and a bright state voltage and effectively reducing the probability of false determination in the detection of a touch event.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical touch display panel, comprising:
   a plurality of light-sensing touch units, each of the light-sensing touch units comprising:
      a light-sensing component, for sensing a light source to generate a sensing signal;
      a storage capacitor, connected electrically to the light-sensing component for storing the sensing signal;
      a signal reading component, connected electrically to the storage capacitor for reading a voltage of the storage capacitor to generate a reading signal; and
      a charging component, connected electrically to the storage capacitor and for charging the storage capacitor to reset an electric charge record of the storage capacitor; and
   a position detecting circuit, connected electrically to the light-sensing touch units for detecting a touch point on the optical touch display panel according to a reading signal output by each of the light-sensing touch units,
   wherein the light-sensing component of each of the light-sensing touch units comprises a first input-end and a first output-end, and the charging component of the same light-sensing touch unit comprises a second input-end connected electrically to the first input-end and a second output-end connected electrically to the first output-end, the first output-end and the second output-end are connected electrically to the storage capacitor of the same light-sensing touch unit, the first input-end and the second input-end receive a reset signal, the first output-end outputs a first charging signal corresponding to the reset signal, and the second output-end outputs a second charging signal corresponding to the reset signal.

2. The optical touch display panel according to claim 1, wherein the light-sensing component of each of the light-sensing touch units comprises a first control-end for receiving a control signal, and the light-sensing component outputs, according to the control signal, the first charging signal to the storage capacitor to charge the storage capacitor.

3. The optical touch display panel according to claim 2, wherein the charging component of each of the light-sensing touch units comprises a second control-end, connected electrically to the first control-end of the light-sensing component of the same light-sensing touch unit, for outputting, according to the received control signal, the second charging signal to the storage capacitor to charge the storage capacitor.

4. The optical touch display panel according to claim 2, wherein the signal reading component of each of the light-sensing touch units comprises a third control-end, and the optical touch display panel further comprises:
   a plurality of pixel regions, the light-sensing touch units being provided corresponding to the pixel regions;
   a scan driving circuit, for controlling whether the pixel regions respectively receive an image signal; and
   a plurality of scan signal lines, arranged along a first direction, one end of each of the scan signal lines being connected electrically to the scan driving circuit, the other end thereof being connected electrically to the third control-ends of the signal reading components of the light-sensing touch units along a second direction, and the first direction being perpendicular to the second direction, wherein the third control-end of the signal reading component of each of the light-sensing touch units is connected electrically to a first signal line of the scan signal lines, and the first control-end is connected electrically to a second signal line adjacent to the first signal line in the scan signal lines.

5. The optical touch display panel according to claim 4, wherein the first input-end and the second input-end are connected electrically to the first control-end, the first signal line, or the second signal line.

6. The optical touch display panel according to claim 2, wherein the charging component of each of the light-sensing touch units comprises a second control-end, connected electrically to the first control-end of the light-sensing component of the light-sensing touch unit adjacent thereto in the first direction, for outputting, according to the received control signal, the second charging signal to the storage capacitor to charge the storage capacitor.

7. The optical touch display panel according to claim 6, wherein the signal reading component of each of the light-sensing touch units comprises a third control-end, and the optical touch display panel further comprises:
   a plurality of pixel regions, the light-sensing touch units being provided corresponding to the pixel regions;
   a scan driving circuit, for controlling whether the pixel regions respectively receive an image signal; and
   a plurality of scan signal lines, arranged along a first direction, one end of each of the scan signal lines being connected electrically to the scan driving circuit, the other end thereof being connected electrically to the third control-ends of the signal reading components of the light-sensing touch units along a second direction, and the first direction being perpendicular to the second direction, wherein the third control-end of the signal reading component of each of the light-sensing touch units is connected electrically to a first signal line of successively adjacent first signal line, second signal line, and third signal line in the scan signal lines, the first control-end of the light-sensing component of each of the light-sensing touch units is connected electrically to the second signal line, and the second control-end of the charging component of each of the light-sensing touch units is connected electrically to the third signal line.

8. The optical touch display panel according to claim 7, wherein the light-sensing component of each of the light-sensing touch units comprises a first input-end and a first output-end, the charging component of the same light-sensing touch unit comprises a second input-end and a second output-end, the first output-end and the second output-end are connected electrically to the storage capacitor of the same light-sensing touch unit, the first input-end receives a first reset signal, the second input-end receives a second reset signal, the first output-end outputs a first charging signal corresponding to the first reset signal, and the second output-end outputs a second charging signal corresponding to the second reset signal.

9. The optical touch display panel according to claim 8, wherein one of the first input-end and the second input-end is connected electrically to the first control-end, the second control-end, the first signal line, the second signal line, or the third signal line.

10. The optical touch display panel according to claim 1, further comprising:
   a shielding component, provided on a light receiving path between the charging component in the light-sensing touch units and a light source.

11. The optical touch display panel according to claim 1, wherein the light-sensing component and the charging component are the same light-sensing transistor component, the light-sensing transistor component has an illuminated area and a light-sensing area smaller than the illuminated area, and the light-sensing transistor component senses a light source according to the illuminated area to generate the sensing signal.

12. The optical touch display panel according to claim 1, wherein the storage capacitor comprises a first end and a second end, the first end being connected electrically to the light-sensing component and the signal reading component, and the second end being used for receiving an alternating current signal.

13. An optical touch display panel, comprising:
   a plurality of light-sensing touch units, each of the light-sensing touch units comprising:
      a light-sensing component, for sensing a light source to generate a sensing signal;
      a storage capacitor, connected electrically to the light-sensing component for storing the sensing signal;
      a signal reading component, connected electrically to the storage capacitor for reading a voltage of the storage capacitor to generate a reading signal, the signal reading component comprising a third control-end; and
      a charging component, connected electrically to the storage capacitor and for charging the storage capacitor to reset an electric charge record of the storage capacitor;
   a position detecting circuit, connected electrically to the light-sensing touch units for detecting a touch point on the optical touch display panel according to a reading signal output by each of the light-sensing touch units;
   a plurality of pixel regions, the light-sensing touch units being provided corresponding to the pixel regions;
   a scan driving circuit, for controlling whether the pixel regions respectively receive an image signal; and
   a plurality of scan signal lines, arranged along a first direction, one end of each of the scan signal lines being connected electrically to the scan driving circuit, the other end thereof being connected electrically to the third control-ends of the signal reading components of the light-sensing touch units along a second direction, and the first direction being perpendicular to the second direction, wherein the third control-end of the signal reading component of each of the light-sensing touch units is connected electrically to a first signal line of the scan signal lines, and a first control-end of a light-sensing component of the same light-sensing touch unit is connected electrically to a second signal line adjacent to the first signal line in the scan signal lines.

14. The optical touch display panel of claim 13, wherein the light-sensing component of each of the light-sensing touch units comprises a first input-end and a first output-end, and the charging component of the same light-sensing touch unit comprises a second input-end connected electrically to the first input-end and a second output-end connected electrically to the second output-end, the first output-end and the second output-end are connected electrically to the storage capacitor of the same light-sensing touch unit, the first input-end and the second input-end receive a reset signal, the first output-end outputs a first charging signal corresponding to the reset signal, and the second output-end outputs a second charging signal corresponding to the reset signal.

* * * * *